(12) United States Patent
LeVey

(10) Patent No.: US 10,486,290 B2
(45) Date of Patent: Nov. 26, 2019

(54) FASTENER DRIVE AND RELEASE SYSTEM, FASTENER THEREFOR AND METHOD

(71) Applicant: Atlas Bolt & Screw Company LLC, Ashland, OH (US)

(72) Inventor: Kenneth LeVey, Chicago, IL (US)

(73) Assignee: Atlas Bolt & Screw Company LLC, Ashland, OH (US)

( * ) Notice: Subject to any disclaimer, the term of this patent is extended or adjusted under 35 U.S.C. 154(b) by 443 days.

(21) Appl. No.: 15/197,876

(22) Filed: Jun. 30, 2016

(65) Prior Publication Data

US 2017/0021481 A1    Jan. 26, 2017

Related U.S. Application Data

(60) Provisional application No. 62/268,142, filed on Dec. 16, 2015, provisional application No. 62/194,554, filed on Jul. 20, 2015.

(51) Int. Cl.
*B25B 23/14* (2006.01)
*B25B 23/10* (2006.01)
(Continued)

(52) U.S. Cl.
CPC ........ *B25B 23/141* (2013.01); *B25B 23/0064* (2013.01); *B25B 23/10* (2013.01); *F16B 31/028* (2013.01)

(58) Field of Classification Search
CPC ... B25B 23/141; B25B 23/0064; B25B 23/10; F16B 31/028
See application file for complete search history.

(56) References Cited

U.S. PATENT DOCUMENTS 5,524,512 A    6/1996  Wolfe
5,538,089 A *  7/1996  Sanford ............. B25B 23/0064
                                              173/13
(Continued)

FOREIGN PATENT DOCUMENTS

DE    102009003404 A1 *  8/2010  ............. B25B 23/10
GB       2411373 A    *  8/2005  ............. B25B 23/10

OTHER PUBLICATIONS

International Preliminary Report on Patentability issued by ISA/EPO in connection with PCT/US2016/041327 dated Jan. 23, 2018.

*Primary Examiner* — Joseph J Hail
*Assistant Examiner* — J Stephen Taylor
(74) *Attorney, Agent, or Firm* — Levenfeld Pearlstein, LLC

(57) ABSTRACT

A fastener drive and release system is used with a rotational driver to drive a fastener having a washer into a workpiece. The system includes a body, a drive assembly, a tool head and a release tip. The drive assembly includes a rotating drive portion with a first engaging member and a driven portion having a second engaging member. The driven portion reciprocates between an engaged position in which the first and second engaging members engage one another and a disengaged position. The driven portion includes a drive head to engage the fastener. The tool head is disposed at an end of the body, through which the drive head extends. The release tip is disposed on the tool head and has resilient fastener head receiving and force absorbing portions. The fastener is driven into the workpiece by rotational movement imparted to the driven portion. When the fastener is driven into the workpiece the force absorbing portion compresses and the driven portion disengages from the drive portion to stop rotation of the fastener.

21 Claims, 7 Drawing Sheets

(51) Int. Cl.
*F16B 31/02* (2006.01)
*B25B 23/00* (2006.01)

(56) References Cited

U.S. PATENT DOCUMENTS

2012/0144637 A1* 6/2012 Nagel, III ................. B25B 9/00
29/278
2015/0283683 A1* 10/2015 Ilzarbe Ripoll ......... B25B 23/10
81/451
2016/0061248 A1* 3/2016 Stewart ................ F16B 31/028
411/360

* cited by examiner

FASTENER DRIVE AND RELEASE SYSTEM, FASTENER THEREFOR AND METHOD

CROSS-REFERENCE TO RELATED APPLICATION DATA

This application claims the benefit of and priority to Provisional U.S. Patent Application Ser. No. 62/268,142, filed Dec. 16, 2015 and Provisional U.S. Patent Application Ser. No. 62/194,554, filed Jul. 20, 2015, the disclosures of which are incorporated herein in their entirety.

BACKGROUND

Self-drilling fasteners are used in all manner of construction. In a typical operation, a drill or other rotational driver is used to drive or rotate a fastener through a member such as drywall or a roofing panel into a substrate, such as a wall stud or roof joist. In some applications, torque is used to indicate proper joint tensioning or tightening. One drawback to using torque is that there is no correlation between the torque needed to drive a fastener and the proper tension or compression of a joint.

Moreover, the use of torque can be problematic for a number of other reasons. First, the torque needed to properly drive and seat a fastener into a workpiece will vary depending upon the members into which the fastener is driven. For example, driving a fastener into soft wood requires much less torque than driving a fastener into a hard wood. As such, when driving a fastener it is not unknown to strip the softer wood or to break a fastener when driving into a hard wood or into metal.

The use of joint compression or tension as determinant can be more difficult when components are present on a fastener. For example, when washers or grommets, particularly compressible, e.g., rubber or polymeric washers or grommets, are present under the head of fasteners to provide a seal, proper compression is difficult to determine and as such, the likelihood of over-driving or under-driving a fastener is increased.

Other devices and methods are known for determining proper driving and position of fasteners. For example, devices are known that operate on fastener/substrate position. However, here too, the presence of additional components on a fastener make such determinations problematic.

Accordingly, there is a need for a fastener drive and release system, a fastener and a method that serves to determine when a fastener is driven to a proper depth. Desirably, such a system and method uses a physical change in components of the system based upon joint compression, to carry out such a determination independent of the torque applied to the fastener. More desirably still, such a system and method stops the fastener driving movement and releases the fastener when a desired compression or tension is achieved. Still more desirably, such a system and method provides positive securement of the fastener during driving, up to release of the fastener.

SUMMARY

Various embodiments of the present disclosure provide a fastener drive and release system and a fastener in which there is a direct correlation of the joint compression or tension to stop driving the fastener and releasing the fastener from the drive device.

The fastener drive and release system is used with a rotational driver, such as a drill, to driving a fastener having a washer into a workpiece. The system includes a body, a drive assembly disposed at least in part in the body, a tool head and a release tip.

The drive assembly includes a rotating drive portion. The drive portion is longitudinally stationary in the body. The drive portion includes a first engaging member. The drive assembly further includes a driven portion that includes a second engaging member for engaging the first engaging member. In an embodiment, the engaging members are formed as meshing crenellated plates.

The driven portion reciprocates between an engaged position in which the first and second engaging members engage one another to impart rotational movement from the drive portion to the driven portion and a disengaged position in which the first and second engaging members are disengaged from one another. The driven portion includes a drive head configured to engage the fastener.

The tool head is disposed at an end of the body and has a bore through which the drive head extends. The release tip is disposed on the tool head. The release tip has a resilient fastener head receiving portion and a resilient force absorbing portion.

The fastener is driven into the workpiece by rotational movement imparted to the driven portion. When the fastener is driven into the workpiece the force absorbing portion compresses and the driven portion disengages from the drive portion to stop rotation of the fastener.

In an embodiment, the release tip is formed from a resilient polymeric material. The release tip can include a ring support disposed between the fastener head receiving portion and the force absorbing portion. The ring support is positioned on the tool head such that the fastener head receiving portion extends beyond an end of the tool head.

The fastener head receiving portion can be formed having a plurality of inwardly depending resilient fingers and the force absorbing portion can be formed having includes a plurality of resilient, spirally extending fingers. The fingers flex to permit a limited amount of travel of the body relative to the drive head.

A fastener and fastener drive and release system are used with a rotational driver, such as a drill, for driving the fastener into a workpiece. The system includes a fastener having a shank and a head, and a compressible washer positioned on the shank. The drive and release system has a body and a drive assembly includes a drive portion having a first engaging member and a driven portion having a second engaging member for engaging the first engaging member.

The fastener is driven into the workpiece by rotational movement imparted to the driven portion. When the fastener is driven into the workpiece, the compressible washer compresses, contacting the resilient fastener head receiving portion and urging the head receiving portion outwardly to release the fastener. The force absorbing portion compresses and the driven portion disengages from the drive portion to stop rotation of the fastener.

The washer can be a conical washer such that the washer compresses and flexes as the fastener is driven into the workpiece.

In an embodiment, the fastener drive and release system includes a tool having a body having a drive assembly disposed, at least in part, in the body. The drive assembly includes a drive portion configured for rotating movement. The drive portion is longitudinally stationary and includes a first engaging member.

The drive assembly further includes a driven portion configured for rotational movement. The driven portion includes a second engaging member for engagement with the first engaging member. The driven portion is configured for reciprocation between an engaged position in which the first and second engaging members engage one another to impart rotational movement from the drive portion to the driven portion and a disengaged position in which the first and second engaging members are disengaged from one another. The driven portion includes a drive head configured to engage the fastener.

A tool head is disposed at an end of the body. The tool head has a bore therein through which the drive head extends. A release tip is disposed on the tool head. The release tip has a resilient fastener head receiving portion and a resilient force absorbing portion, such that when the fastener is driven into the workpiece by rotational movement imparted to the driven portion, and the fastener is driven into the workpiece, the force absorbing portion compresses and the driven portion disengages from the drive portion to stop rotation of the fastener. In an embodiment, the tool head is removably mounted to the body.

In an embodiment, when the fastener is driven into the workpiece, the driven portion ceases rotational movement. In such an embodiment, the drive portion is configured to permit continued rotational movement. The body can be configured to rotate with the with the drive portion. In such an embodiment, a bushing is disposed between the driven portion and the body. The drive portion and the driven portion can be biasedly mounted away from one another.

These and other features and advantages of the present disclosure will be apparent from the following detailed description, in conjunction with the appended claims.

BRIEF DESCRIPTION OF THE DRAWINGS

FIGS. 2 and 2A illustrate the tool attachment of FIG. 1 with a fastener secured in the tool, in which FIG. 2A is an enlarged view of an end of the tool showing the fastener secured therein;

FIGS. 3A and 3B are cross-sectional views of the tool attachment, in which FIG. 3A illustrates the fastener loaded into the tool, prior to driving the fastener and FIG. 3B illustrates the tool as the fastener is beginning to be driven into a workpiece;

DETAILED DESCRIPTION

Figure 1:
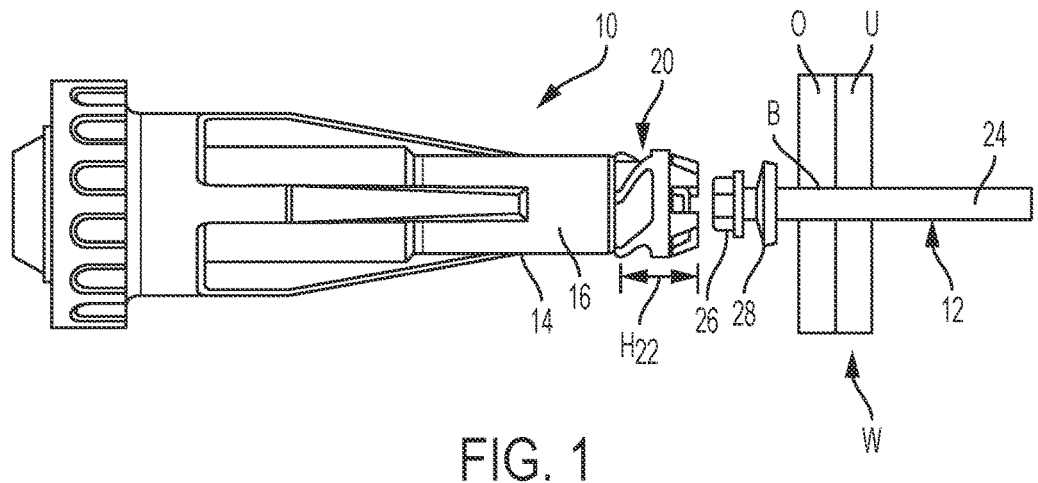
FIG. 1 is a schematic illustration of an embodiment of a fastener drive and release system tool attachment, illustrated with a fastener and washer.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Referring now to the figures and in particular to FIG. 1 there is shown an example of an embodiment of a fastener drive and release system 10 and a fastener 12. The fastener drive system 10 includes a tool 14 having a body 16, a drive assembly 18, a tool head 20 and a release tip 22. The fastener 12 includes a shank 24, a head 26, a driving tip (not shown) opposite the head and a washer 28, such as the illustrated conical washer.

In a contemplated arrangement, the tool 14 is mounted to a drill 30 or other drive for imparting rotational movement to the drive assembly 18. Accordingly, the tool drive assembly 18 includes a drive portion or assembly 32 operably mounted to the drive 30 and a driven portion 34 to which the fastener 12 is mounted. The drive portion 32 is mounted, at least in part, within the body 16. The drive portion 32 is longitudinally stationary, and the driven portion 34 is mounted for reciprocating movement within the body 16 toward and away from the drive portion 32. The driven portion 34 is biased away from the drive portion 32 by, for example, a spring 33, shown in FIG. 3A.

Figure 6A:
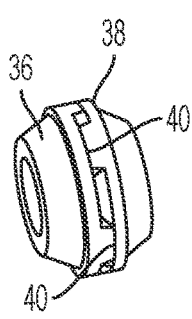
FIGS. 6A and 6B are illustrations of the tool drive plates in then engaged state (FIG. 6A) and a disengaged states (FIG. 6B)
Figure 6B:
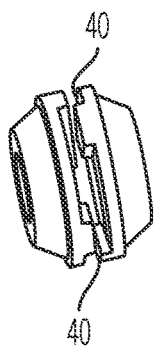

Referring briefly to FIGS. 6A and 6B, a pair of engaging members 36, 38, such as the illustrated drive plates, includes a first plate 36 mounted to the drive portion 32 and a second plate 38 mounted to the driven portion 34. As the driven portion 34 reciprocates, the plates 36, 38 engage with and disengage from one another as will be described in more detail below. In an embodiment, the plates 36, 38 include meshing teeth or crenellations 40 extending therefrom such that as the second plate 38 moves toward the first plate 36, the crenellations 40 mesh and the first plate 36 drives or rotates the second plate 38 and thus the driven portion 34. Conversely, when the second plate 38 moves away from the first plate 36, the crenellations 40 disengage and rotation of the driven portion 34 ceases.

A drive head 42 is mounted to an end of the driven portion 34 for engaging the fastener head 26. The drive head 42 can take many forms, such as a hex drive, Phillips head, star drive and the like. The drive head 42 extends outwardly from the tool 14 through a bore 44 in the tool head 20. The tool head 20 includes a ledge or stop 46 and a smaller diameter end portion, as indicated at 48, adjacent to the stop 46. In an embodiment, the stop 46 is formed as a step.

The release tip 22 is mounted to the tool head 20. The tip 22 includes a ring support 50 that encircles the head 20, a resilient cage 52 depending from the ring support 50 in which the fastener head 26 is supported and held, and a resilient force absorbing portion 54 extending opposite the cage 52. In an embodiment, the cage 52 includes a plurality of fingers 56 that depend from the ring support 50 that terminate in inwardly oriented free ends 58. The fingers 56 flex so that the fastener head 26 can be captured between and supported or held by the fingers 56 and is readily released from the tip 22 as the fingers 56 flex outwardly. In the illustrated embodiment, the force absorbing portion 54 is formed by a plurality of upwardly, spirally oriented resiliently mounted fingers 60 that flex so as to shorten a height $H_{22}$ of the tip 22. In an embodiment, the release tip 22 is formed from a resilient polymeric material.

The ring support 50 is positioned on the tool head 20 with the force absorbing portion 54, e.g., the spiral fingers 60, positioned abutting or adjacent to the step 46. The head capture fingers 56 extend beyond the tool head 20 to capture the fastener 12 and to hold the fastener 12 prior to and as it is being driven into the workpiece W.

Figure 2:
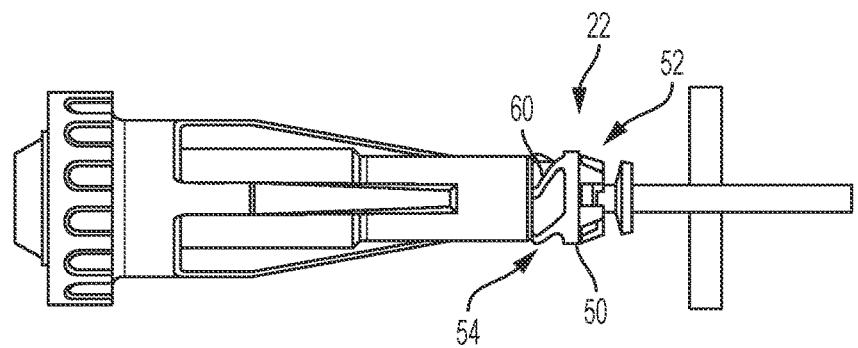
Figure 2A:
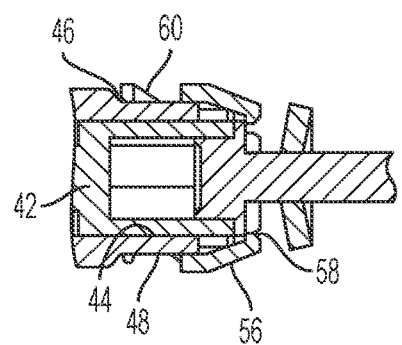

In use, referring to FIG. 2, the fastener 12, with a washer 28, such as the illustrated conical washer, is positioned with the fastener head 26 in the cage 52. When properly positioned in the cage 52, the free ends 58 of the fingers 56 contact the end or the underside of the fastener head 26. The driving tip (not shown) of the fastener is positioned on an outer surface of an outer member O to be joined to an underlying member U. For purposes of the present disclosure, the outer member O and underlying member U are referred to collective as the workpiece W. As discussed above, the outer member O can be, for example, a roof panel (decking), wall panel or the like and the underlying member U can be, for example, a steel roof member, wall stud or the like. A hole B may be formed in the outer member O or the fastener 12 can be of the self-drilling type. Such fasteners 12 and workpieces W, as well as other configurations of members to be joined, will be recognized by those skilled in the art and are within the scope and spirit of the present disclosure.

Figure 3A:
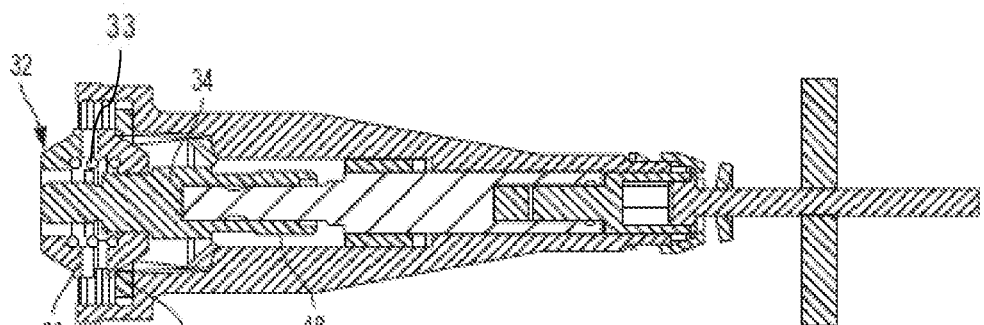
Figure 3B:
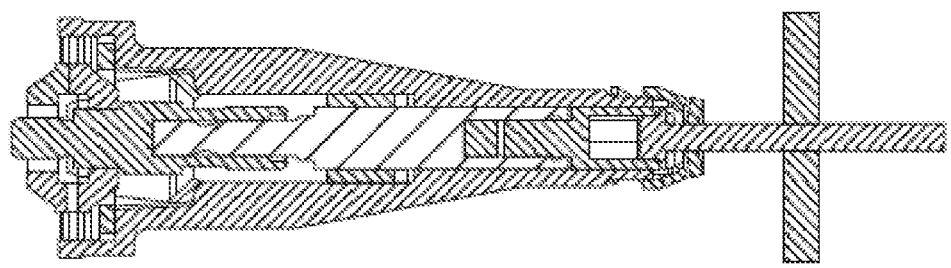

Referring now to FIGS. 3A and 3B, as a force is applied to the tool 14 and fastener 12, the driven portion 34 is urged rearward, against the bias, so that the second plate 38 engages the first plate 36. This imparts rotating movement to the second plate 38 and the driven portion 34 to drive the fastener 12 into the workpiece. As the fastener 12 is driven into the workpiece W, the fastener head 26 remains held in the cage 52 and the washer 28 abuts the free ends 58 of the head capture fingers 56 as illustrated in FIG. 4B.

Figure 4A:
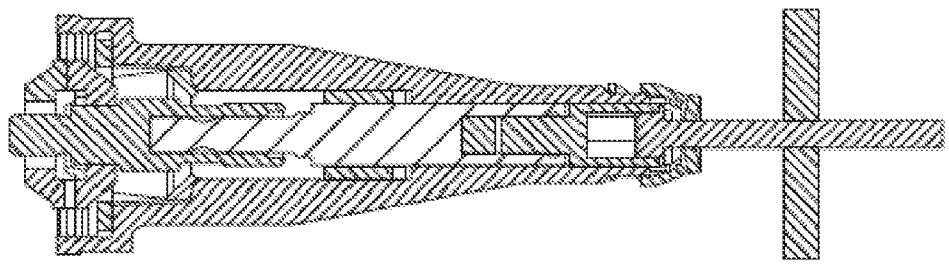
FIGS. 4A and 4B are views similar to FIGS. 3A and 3B, in which the fastener is being driven into workpiece (FIG. 4A) and in which the fastener is being tightened against the workpiece and the washer contacts the workpiece (FIG. 4B)
Figure 4B:
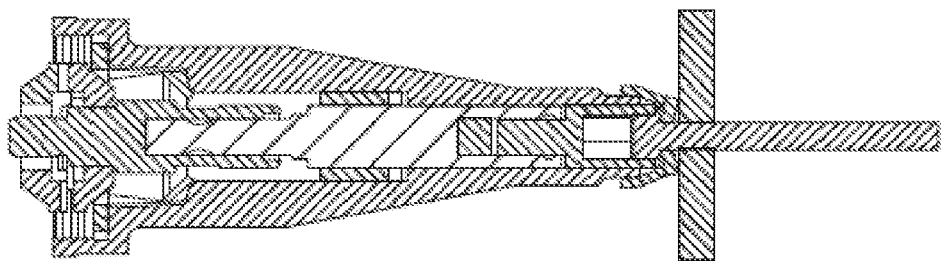
Figure 5A:
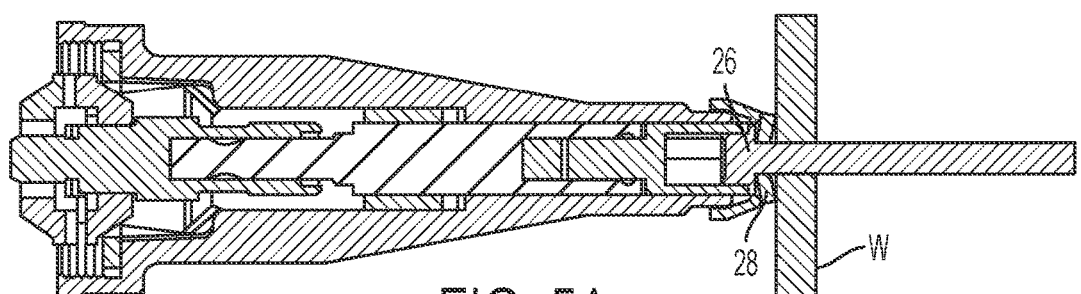
FIGS. 5A and 5B are again views similar to FIGS. 4A and 4B, in which, in FIG. 5A the fastener is further tightened against the workpiece (an the washer contacts the workpiece) and in which in FIG. 5B, the fastener is fully tightened against the workpiece, the washer is flattened (or compressed against the workpiece) and the fastener is released from the tool.
Figure 5B:
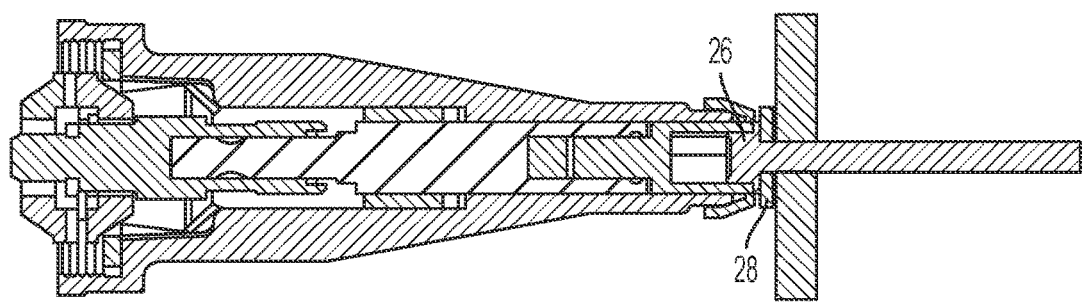
Figures 7A, 7B, 7C:
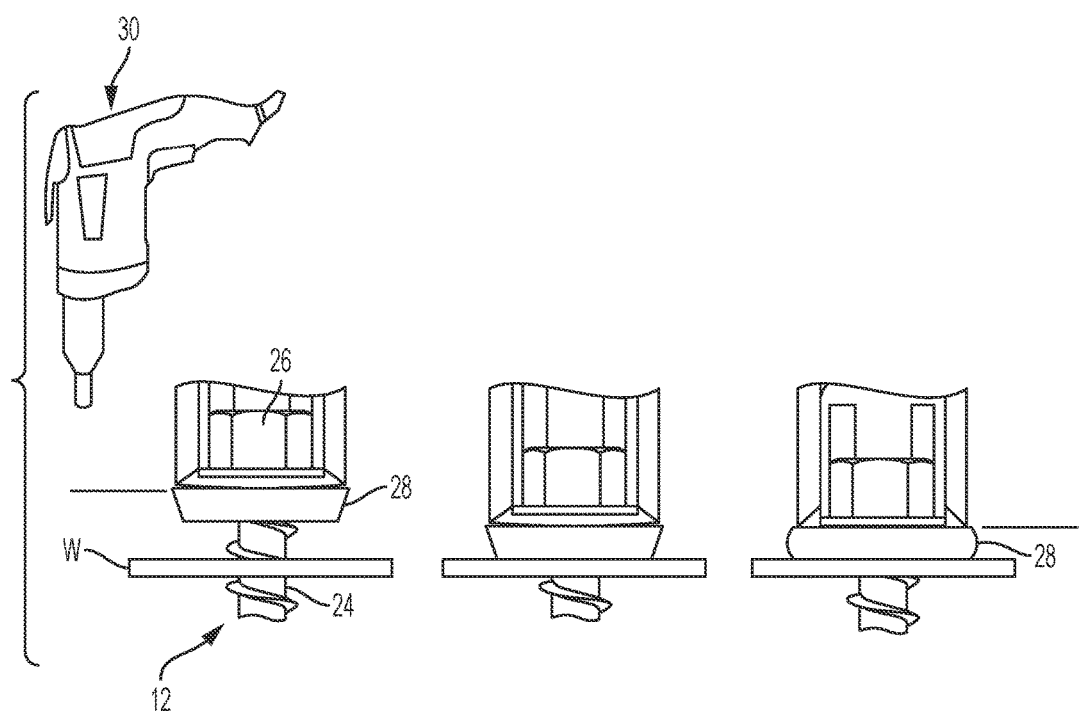
FIGS. 7A-7C are illustrations of the tool head and fastener showing the fastener being tightened and the washer spaced from the workpiece (FIG. 7A), the fastener and washer seated on the workpiece (FIG. 7B), and the fastener tightened to the desired tension or compression, the washer compressed against the workpiece and as the driver is disconnecting from the fastener (FIG. 7C)
Figure 8:
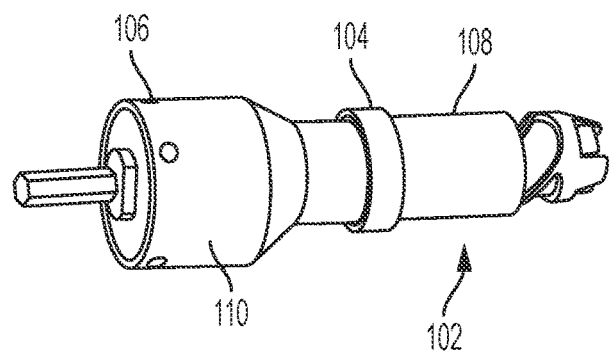
FIG. 8 is a perspective illustration of another embodiment of the fastener drive and release system tool attachment.
Figure 9:
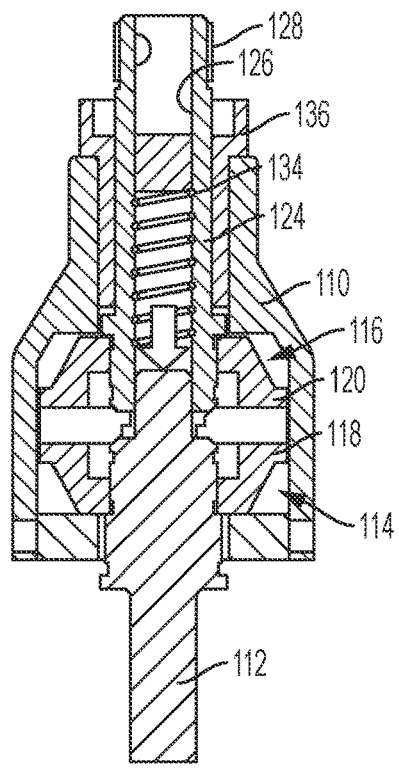
FIG. 9 is a cross-sectional view of the drive assembly of the tool attachment of FIG. 8.
Figure 10:
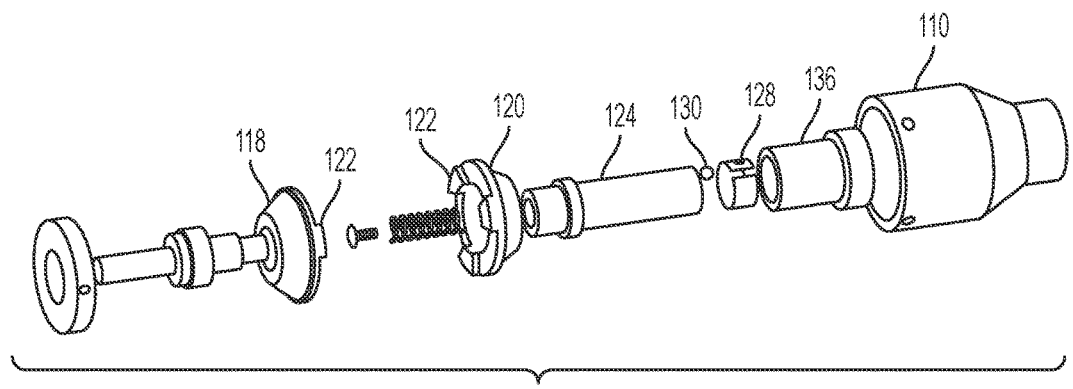
FIG. 10 is an exploded view of the drive assembly.

As seen in FIGS. 4B and 5A, as the fastener 12, led by the washer 28, contacts the workpiece W, continued rotation and forward movement of the driven portion 34 begins to disengage the second plate 38 from the first plate 36. At the same time, the release tip 22 is urged rearwardly such that the spiral fingers 60 flex, to an extent, which prevents continued forward movement of the tool 14. Also at the same time, the fastener 12 tightens on the washer 28 which compresses and flattens (see, e.g., FIGS. 5B and 7C), allowing the driven portion 34 to move further forward (toward the workpiece W). This, in turn permits the second plate 38 to fully disengage from the first plate 36 and thus stops the driving motion of the fastener 12 as seen in FIG. 5B (which shows the second plate 38 fully disengaged from the first plate 36, the fastener 12 and washer 28 fully engaged with the workpiece W and the fastener 12 released from the release tip 22). Essentially, the body 16 allows the datum of the fastener head 26 and washer 28 to disengage the second plate 38 from the first plate 36 in that as the washer 28 flexes or compresses, due to the forces delivered through the joint, the position of the datum changes to allow the driven portion 34 to move away from the drive portion 32. That is, as the fastener 12 is driven into the workpiece W, the fingers 60 flex as the tip 22 and fastener 12 engage the workpiece W, allowing the tip 22 to travel rearwardly (e.g., travel toward and relative to the drive head 42).

A number of features and aspects of the present disclosure will be appreciated from the figures and the above description. For example, the release tip 22 maintains the fastener 12 engaged with and secured in the tool 14 with only a snug fit of the fastener 12 in the release tip 22. This eliminates the need for magnets or other devices to "hold" the fastener in the tool during use. In addition, the present example shows the self-limiting nature of driving the fastener 12 into the workpiece W. That is, while the rearward movement of the release tip 22 permits the forward movement of the fastener 12, it also maintains the body 16 (and thus the drive 30, e.g., the drill) spaced from the workpiece W. Thus, as the driven portion 34 of the tool 14 and fastener 12 continue to move toward the workpiece W, this also serves to disengage the driven portion 34 from the drive portion 32 (e.g., separates the plates 36, 38) and thus stops continued rotation and penetration of the fastener 12, and prevents over-driving the fastener 12 into the workpiece W.

Another embodiment of the fastener drive and release system 102 is illustrated in FIGS. 8-13. In this embodiment, the tool 104 includes a drive assembly 106 and a bit assembly 108. The drive assembly 106 is housed within a drive body 110. In a contemplated arrangement, the tool 104 is mounted to a drill or other drive (not shown) for imparting rotational movement to the tool 104. In a current embodiment, the tool 104 includes an input shaft 112 for mounting to the drive. The tool can be readily mounted in a chuck of known drivers (not shown). In an embodiment, the shaft 112 has the form of a three-sided shaft to allow for mounting in a three-jaw chuck.

The drive assembly 106 includes a drive portion 114 operably mounted to the shaft 112 and body 110. The drive portion 114, input shaft 112 and body 110 rotate together with one another as a unit. A driven portion 116 is mounted for reciprocating and rotational movement, in part, within the body 110, and reciprocates toward and away from the drive portion 114.

The drive assembly 106 includes a pair of engaging members 118, 120 such as the illustrated drive plates. The first plate 118 is mounted to the drive portion 114 and the second plate 120 is mounted to the driven portion 116. As the driven portion 116 reciprocates, the plates 118, 120 engage with and disengage from one another as will be described in more detail below. In an embodiment, the plates 118, 120 include meshing teeth or crenellations 122 extending therefrom such that as the second plate 120 moves toward the first plate 118, the crenellations 122 mesh and the first plate 118 drives or rotates the second plate 120 and thus the driven portion 116. Conversely, when the second plate 120 moves away from the first plate 118, the crenellations 122 disengage and rotation of the driven portion 116 ceases.

A retainer shaft 124 is mounted to the second plate 120 and rotates with the second plate 120. The retainer shaft 124 has a central bore 126 that receives a portion of the input shaft 112 to maintain the retainer shaft 124 and second plate 120 aligned with the input shaft 112 and first plate 118. A bit retainer ring 128 and embedded ball 130 are located at an opposite end of the retainer shaft 124 and are configured to receive a driver bit 132 and to secure the driver bit 132 in the end of the retainer shaft 124. A spring 134 is positioned in the bore 126 engaged with the end of the input shaft 112. The spring 134 biases the driven portion 116 away from the drive portion 114.

A bushing 136 is positioned around the retainer shaft 124 between the retainer shaft 124 and the body 110. As will be described in more detail below, in this manner when the retainer shaft 124 stops rotating, the body 110 can continue to rotate freely about the retainer shaft 124.

Figure 11:
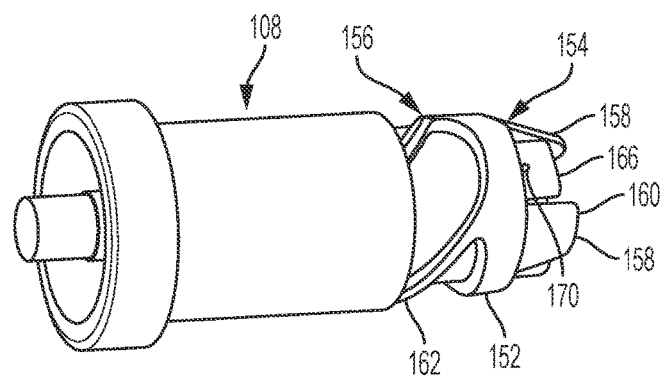
FIG. 11 is a perspective illustration of the bit assembly of the tool attachment.
Figure 12:
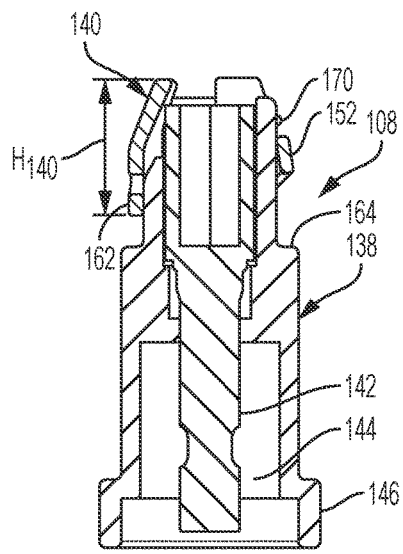
FIG. 12 is a cross-sectional view of the bit assembly.
Figure 13:
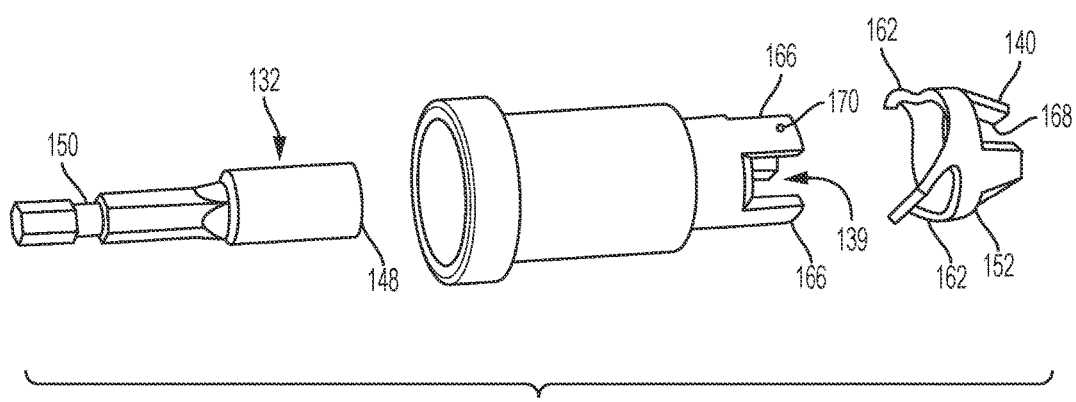
FIG. 13 is an exploded view of the bit assembly.

The bit assembly 108 is illustrated in FIGS. 11-13. The bit assembly 108 includes a driver tip 138, the driver bit 132, and a fastener or screw retainer 140. The driver tip 138 is formed as a sleeve 142 that defines an internal bore 144. The sleeve 142 includes an end flange 146 having a generally cup-shaped profile. An end of the cup-shaped flange 146 fits and secures onto the end of the drive assembly 106. An opposite end (indicated generally at 139) of the driver tip 138 can be trifurcated to, for example, secure the screw retainer 140 at the end, as is described in more detail below.

The driver bit 132 is of a known type that has a drive end 148 that is configured to cooperate with a fastener. Such a drive end 148 can be, for example, a hex socket, a Phillips head driver, a Torx driver and the like. Those skilled in the art will recognize and appreciate the various types of drives that can be used.

An opposite end of the driver bit 132 be fabricated with a circumferential recess 150 to cooperate with the bit retainer shaft retainer ring 128 and ball 130. Again, those skilled in the art will recognize this commonly used arrangement to maintain the driver bit 132 secured in the bit retainer shaft 124 during use and storage, while also allowing the driver bit 132 to be readily removed for replacement.

The fastener (screw) retainer 140 is similar to that discussed above and includes a ring support 152 that encircles the tip 138, a resilient cage 154 depending from the ring support 152 in which the fastener head is supported and held, and a force absorbing portion 156 extending from the ring support 152 opposite the cage 154. In an embodiment, the cage 154 includes a plurality of head capture fingers 158 that depend (or extend) from the ring support 152 that terminate in inwardly oriented free ends 160. The fingers 158 flex so that the fastener head can be captured between and supported or held by the fingers 158 and is readily released from the fastener retainer 140 as the fingers 158 flex outwardly. In the illustrated embodiment, the force absorbing portion 156 is formed by a plurality of spirally oriented resiliently mounted fingers 162 that flex so as to shorten a height $H_{140}$ of the fastener retainer 140, as illustrated in FIG. 12. In an embodiment, the fastener retainer 140 is formed from a resilient polymeric material. The illustrated fastener retainer 140 includes three equally circumferentially spaced spiral fingers 162.

The ring support 152 is positioned on the driver tip 138 with the force absorbing portion 156, e.g., the spiral fingers 162, positioned abutting or adjacent to a step 164 on the tip 138. The head capture fingers 158 extend beyond the driver tip 138 to capture the fastener and to hold the fastener prior to and as it is being driven into the workpiece.

As noted above, the end of the driver tip 138 can be trifurcated defining a plurality of legs 166. In an embodiment, each leg 166 of the driver tip 138 fits into a space 168 between the head capture fingers 158 to secure the fastener retainer 140 on the driver tip 138. The ends of the legs 166 can include a retaining element, such as a detent or projection 170 that engages the ring support 152 to further secure the fastener retainer 140 on the driver tip 138.

In use, the fastener is positioned in the tool 104 with the head secured in the end of the driver bit 132 and with the head captured by the fastener retainer 140. The spring 134 biases the bit retainer shaft 124 second plate 120 away from the first plate 118—thus the first and second plates 118, 120 are disengaged from one another. As the fastener is urged against the workpiece, the bit retainer shaft 124 is urged rearwardly so that the second plate 120 contacts the first plate 118 (the bit retainer shaft 124 slides within the bushing 136). When the driver (e.g., drill) is actuated, the body 110, the bit retainer shaft 124, the bushing 136 and the driver tip 138 all rotate. That is, the entire tool 104 rotates.

As the fastener comes into engagement with the workpiece, the fastener retainer 140 is urged rearwardly such that the spiral fingers 162 flex, to an extent, which prevents continued forward movement of the tool 104. At the same time, the fastener tightens on the washer which compresses and flattens, allowing the driven portion to move further forward toward the workpiece W (see, FIGS. 2-5). This, in turn permits the second plate 120 to fully disengage from the first plate 118 and thus stops the driving motion of the fastener. As the fastener stops rotating, so does the bit assembly 108 (including the driver tip 138, driver bit 132, and fastener retainer 140). However, as noted above, because the tool 104 is mounted to a drill, the tool body 110 will continue to rotate until the drill is stopped. The bushing 136 between the body 110 and the bit retainer 124 shaft isolates the drive portion 114 (the body 110 and first plate 118) from the driven portion 116 (the second plate 120, retainer shaft 124 and driver tip 138), so that the latter parts (the driven portion 116) can stop with the fastener, independent of the former, drive parts (the drive portion 114).

It will be appreciated that this arrangement, which allows the fastener and driver 138 tip to stop once the fastener is fully engaged with the workpiece W, while the body 110 still rotates, provides a number of benefits. First, the tool body 110 allows the datum of the fastener head and washer relative to the workpiece W, to disengage the second plate 120 from the first plate 118 as the washer flexes or compresses, in that due to the forces delivered through the joint, the position of the datum changes to allow the driven portion 116 to move away from the drive portion 114.

That is, as the fastener 12 is driven into the workpiece W, the fingers 162 flex as the tip 138 and fastener 12 engage the workpiece W, allowing the tip 138 to travel rearwardly (e.g., travel toward and relative to the drive assembly 106). In addition, because those portions of the system that may contact the workpiece W (the fastener, the fastener retainer 140 and the driver tip 138) stop when they engage the workpiece W, there is less opportunity for a rotating part of the system 102 to damage the workpiece W, for example, a finished roof panel. Thus, the system is self-limiting with respect to driving the fasteners.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will be appreciated by those skilled in the art that the relative directional terms such as upper, lower, rearward, forward and the like are for explanatory purposes only and are not intended to limit the scope of the disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A fastener drive and release system for use with a rotational driver, for driving a fastener having a washer into a workpiece, the system comprising:
   a body;
   a drive assembly disposed, at least in part, in the body, the drive assembly including a drive portion configured for rotating movement, the drive portion being longitudinally stationary and including a first engaging member, the drive assembly further including a driven portion configured for rotational movement, the driven portion including a second engaging member for engagement with the first engaging member, the driven portion configured for reciprocation between an engaged position in which the first and second engaging members engage one another to impart rotational movement from the drive portion to the driven portion and a disengaged position in which the first and second engaging members are disengaged from one another, the driven portion including a drive head configured to engage the fastener;
   a tool head disposed at an end of the body, the tool head having a bore therein through which the drive head extends; and
   a release tip disposed on the tool head, the release tip having a resilient fastener head receiving portion configured for movements to selectively hold and release the fastener, and a resilient force absorbing portion connected to the resilient fastener head receiving portion and configured for compressive movement relative to the drive head,
   wherein the fastener is driven into the workpiece by rotational movement imparted to the driven portion, and wherein when the fastener is driven into the workpiece the force absorbing portion compresses to allow axial travel of the release tip relative to the drive head, the resilient fastener head receiving portion moves to release the fastener, and the driven portion disengages from the drive portion to stop rotation of the fastener, and
   wherein the force absorbing portion includes a plurality of resilient, spirally extending fingers, wherein the fingers flex when the force absorbing portion compresses to permit the axial travel of the release tip relative to the drive head.

2. The system of claim 1 wherein the release tip is formed from a resilient polymeric material.

3. The system of claim 1 wherein the release tip includes a ring support disposed between the fastener head receiving portion and the force absorbing portion, the ring support positioned on the tool head, wherein the fastener head receiving portion extends beyond an end of the tool head.

4. The system of claim 1 wherein the fastener head receiving portion includes a plurality of inwardly depending resilient fingers.

5. The system of claim 1 wherein the first and second engaging members are crenellated plates configured to engage with and disengage from one another.

6. The system of claim 1 wherein the tool head is removably mounted to the body.

7. The system of claim 1 wherein the tool head is a bit assembly, wherein the bit assembly includes a plurality of legs, and wherein the legs include a retaining element for retaining the release tip on the tool head.

8. The system of claim 7 wherein the retaining element is a projection.

9. A fastener and fastener drive and release system for use with a rotational driver, for driving the fastener into a workpiece, comprising:
   the fastener having a shank and a head, the fastener having a compressible washer positioned on the shank;
   the fastener drive and release system having a body and a drive assembly disposed, at least in part, in the body, the drive assembly including a drive portion configured for rotating movement, the drive portion being longitudinally stationary and including a first engaging member, the drive assembly further including a driven portion configured for rotational movement, the driven portion including a second engaging member for engagement with the first engaging member, the driven portion configured for reciprocation between an engaged position in which the first and second engaging members engage one another to impart rotational movement from the drive portion to the driven portion and a disengaged position in which the first and second engaging members are disengaged from one another, the driven portion including a drive head configured to engage the fastener, the fastener drive and release system further including a tool head disposed at an end of the body, the tool head having a bore therein through which the drive head extends and a release tip disposed on the tool head, the release tip having a resilient fastener head receiving portion configured for movements to selectively hold and release the fastener and a resilient force absorbing portion configured for compressive movement relative to the drive head,
   wherein the fastener is driven into the workpiece by rotational movement imparted to the driven portion, and wherein when the fastener is driven into the workpiece the compressible washer compresses, contacting the resilient fastener head receiving portion and urging the resilient fastener head receiving portion outwardly to release the fastener, and wherein the force absorbing portion compresses allowing axial travel of the release tip relative to the drive head, and the driven portion disengages from the drive portion to stop rotation of the fastener, and
   wherein the force absorbing portion includes a plurality of resilient, spirally extending fingers, wherein the fingers flex when the force absorbing portion compresses to permit the axial travel of the release tip relative to the drive head.

10. The fastener and fastener drive and release system of claim 9 wherein the washer is a conical washer, and wherein the washer compresses and flexes as the fastener is driven into the workpiece.

11. A fastener drive and release system for use with a rotational driver, for driving a fastener having a washer into a workpiece, the system comprising:
   a body;
   a drive assembly disposed, at least in part, in the body, the drive assembly including a drive portion configured for rotating movement, the drive portion being longitudinally stationary and including a first engaging member, the drive assembly further including a driven portion configured for rotational movement, the driven portion including a second engaging member for engagement with the first engaging member, the driven portion configured for reciprocation between an engaged position in which the first and second engaging members engage one another to impart rotational movement from the drive portion to the driven portion and a disengaged position in which the first and second engaging members are disengaged from one another, the driven portion including a drive head configured to engage the fastener;

a tool head disposed at an end of the body, the tool head having a bore therein through which the drive head extends, wherein the tool head is removably mounted to the body; and a release tip disposed on the tool head, the release tip having a resilient fastener head receiving portion configured for movements to selectively hold and release the fastener, and a resilient force absorbing portion configured for compressive movement relative to the drive head, wherein the fastener is driven into the workpiece by rotational movement imparted to the driven portion, and wherein when the fastener is driven into the workpiece the force absorbing portion compresses allowing axial travel of the release tip relative to the drive head, the resilient fastener head receiving portion moves to release the fastener, and the driven portion disengages from the drive portion to stop rotation of the fastener, and wherein the force absorbing portion includes a plurality of resilient, spirally extending fingers, wherein the fingers flex when the force absorbing portion compresses to permit the axial travel of the release tip relative to the drive head.

12. The fastener drive and release system of claim 11, wherein when the fastener is driven into the workpiece, the driven portion ceases rotational movement.

13. The fastener drive and release system of claim 12 wherein the drive portion is configured to permit continued rotational movement.

14. The fastener drive and release system of claim 13, wherein the body rotates with the with the drive portion.

15. The fastener drive and release system of claim 14 including a bushing disposed between the driven portion and the body.

16. The fastener drive and release system of claim 11 wherein the drive portion and the driven portion are biasedly mounted away from one another with a spring.

17. The fastener drive and release system of claim 11 wherein the tool head is a bit assembly, wherein the bit assembly includes a plurality of legs, and wherein the legs include a retaining element for retaining the release tip on the tool head.

18. The fastener drive and release system of claim 17 wherein the retaining element is a projection.

19. The fastener drive and release system of claim 11 wherein the release tip is formed from a resilient polymeric material.

20. The fastener drive and release system of claim 11 wherein the release tip includes a ring support disposed between the fastener head receiving portion and the force absorbing portion, the ring support positioned on the tool head, wherein the fastener head receiving portion extends beyond an end of the tool head.

21. The fastener drive and release system of claim 11 wherein the fastener head receiving portion includes a plurality of inwardly depending resilient fingers.

* * * * *